(12) United States Patent
Baudisch

(10) Patent No.: US 9,098,650 B2
(45) Date of Patent: Aug. 4, 2015

(54) METHOD AND AN APPARATUS FOR AUTOMATICALLY GENERATING A TARGET SIMULATION MODEL FOR A DEFINED SIMULATION OBJECT

(75) Inventor: Thomas Baudisch, Ammersee (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 472 days.

(21) Appl. No.: 13/085,168

(22) Filed: Apr. 12, 2011

(65) Prior Publication Data

US 2011/0257939 A1  Oct. 20, 2011

(30) Foreign Application Priority Data

Apr. 16, 2010 (EP) .................... 10004079
Oct. 12, 2010 (EP) .................... 10187247

(51) Int. Cl.
G06F 17/50 (2006.01)
G06T 17/20 (2006.01)

(52) U.S. Cl.
CPC ............ *G06F 17/5009* (2013.01); *G06F 17/50* (2013.01); *G06T 17/20* (2013.01); *G06F 2217/04* (2013.01)

(58) Field of Classification Search
CPC ................ G06F 17/50; G06T 17/20
USPC ........................................... 703/1
See application file for complete search history.

(56) References Cited

U.S. PATENT DOCUMENTS

| | | | |
|---|---|---|---|
| 6,212,441 B1 * | 4/2001 | Hazama et al. ............ 700/98 |
| 7,031,895 B1 * | 4/2006 | Takahashi et al. .......... 703/13 |
| 7,149,677 B2 * | 12/2006 | Jayaram et al. ............ 703/22 |
| 7,492,364 B2 * | 2/2009 | Devarajan et al. .......... 345/420 |
| 7,515,977 B2 * | 4/2009 | Eryurek et al. ............ 700/83 |
| 8,195,434 B2 * | 6/2012 | Powell ................... 703/2 |
| 8,255,197 B2 * | 8/2012 | Pritchard et al. ........... 703/13 |
| 8,346,020 B2 * | 1/2013 | Guntur .................. 382/293 |
| 8,751,202 B2 * | 6/2014 | Powell ................... 703/2 |
| 2003/0204823 A1 * | 10/2003 | Armstrong et al. .......... 716/2 |
| 2005/0222698 A1 | 10/2005 | Eryurek et al. ............ 700/90 |
| 2007/0283188 A1 * | 12/2007 | Balzer et al. ............. 714/26 |
| 2008/0033897 A1 * | 2/2008 | Lloyd ................... 706/19 |
| 2010/0082314 A1 | 4/2010 | Pritchard et al. ........... 703/13 |

FOREIGN PATENT DOCUMENTS

CN        1760876 A    4/2006

OTHER PUBLICATIONS

Robinson, Stewart; "Simulation: The Practice of Model Development and Use", John Wiley & Sons, Inc., Book, 363 pages, Abstract printed from Internet: 2 pages, Dec. 2, 2003.
Chinese Office Action, Application No. 201110094959.2, 11 pages, Nov. 3, 2014.

* cited by examiner

*Primary Examiner* — Kamini S Shah
*Assistant Examiner* — Juan Ochoa
(74) *Attorney, Agent, or Firm* — Slayden Grubert Beard PLLC

(57) ABSTRACT

A method and an apparatus for automatically generating a target simulation model for a defined simulation object, provides artifacts of the simulation object in a data base; extracts the information needed for generating the target simulation model from the artifacts; maps the object elements based on the defined objective into the elements of the target simulation model; and assembles the extracted information and the mapped elements to generate the target simulation model. The artifacts describe the structure, the behavior, and the physics of the object elements with mechatronics simulation tags representing implicit indirect engineering information not extracted automatically by a tool.

7 Claims, 4 Drawing Sheets

METHOD AND AN APPARATUS FOR AUTOMATICALLY GENERATING A TARGET SIMULATION MODEL FOR A DEFINED SIMULATION OBJECT

CROSS-REFERENCE TO RELATED APPLICATIONS

This application claims priority to EP Patent Application No. 10004079 filed Apr. 16, 2010 and EP Patent Application No. 10187247 filed Oct. 12, 2010. The contents of which are incorporated herein by reference in its entirety.

TECHNICAL FIELD

The invention generally relates to a method, a computer readable medium, a computer program product and an apparatus for automatically generating a target simulation model for a defined simulation object.

BACKGROUND

Simulation is an approach to analyze systems which are too complex for an exact theoretical or mathematical analysis. A simulation performs experiments on a model representing a real system (e.g. industrial control systems, machines, vehicles) to achieve findings and insights of the real system. The models like the systems can be huge, complicated and complex. Therefore the simulation will be executed by computer programs and computers.

The word "Simulation" in this connection subsumes the model set up, the calculation and the interpretation of the results whereas only the model set up and the interpretation of the results consume real manpower. By guess 50% of the whole development time of machine tools and production machines is spent for simulation today while approximately ⅔ of this are used for the model set up and ⅓ for the interpretation of the results. That means especially the effort for setting up simulation models is quite high today and will increase further in the future due to the increasing introduction of mechatronic simulation and more frequent validations of the discipline specific designs.

The patent application US20100082314-A1 discloses a system and methods to simulate the operation of a servo driven mechatronic system to tune the system based on components either manually selected by the user from a database or automatically selected from the database by the system.

SUMMARY

According to various embodiments, an approach to reduce the effort for the set up of simulation models significantly can be provided.

According to an embodiment, a method for automatically generating a target simulation model for a defined object, may comprise: providing artefacts of the object originated during an engineering process, wherein the artefacts describing the structure, the behavior and the physics of elements of the simulation object, and wherein the artefacts comprise mechatronics simulation tags representing implicit indirect available engineering information regarding the simulation object; storing the artefacts in a data base; extracting out of the artefacts the information needed for generating the target simulation model based on a defined objective; mapping the elements of the simulation object needed for generating the target simulation model based on the defined objective into the elements of the target simulation model; and assembling the extracted information and the mapped elements to generate the target simulation model for the defined object.

According to a further embodiment, the step "mapping the elements of the simulation object needed for generating the target simulation model based on the defined objective into the elements of the target simulation model" can be performed by using a transformation matrix comprising rules for the transformation of structure, behavior and the physics of the elements of the simulation object into the target simulation model. According to a further embodiment, the artefacts may comprise a CAD model and the mechatronics simulation tags comprising lines and/or points and/or coordinate systems and/or planes and/or surfaces and/or geometric objects. According to a further embodiment, the data base may be provided by a product data management system or an engineering data management system. According to a further embodiment, the generated target simulation model can be directly used in a simulation system for simulation and/or validation of technical systems.

According to another embodiment, a computer readable medium may comprise instructions which, when executed by a suitable computer, cause the computer to perform the method as described above.

According to yet another embodiment, a computer program product may be directly loadable into the internal memory of a digital computer and comprise software code portions for performing the method steps as described above when said product runs on the computer.

According to yet another embodiment, an apparatus for automatically generating a target simulation model for a defined object, may comprise a creating unit for providing artefacts of the object in a data base, wherein the artefacts are designed during an engineering process, and wherein the artefacts describing the structure, the behavior and the physics of elements of the simulation object, and wherein the artefacts comprise mechatronics simulation tags representing implicit indirect available engineering information regarding the target simulation model; an extracting unit for extracting out of the artefacts the information needed for generating the target simulation model based on a defined objective; a mapping unit for mapping the elements of the simulation object needed for generating the target simulation model based on the defined objective of the target simulation model into the elements of the target simulation model; and an assembling unit for assembling the extracted information and the mapped elements to generate the target simulation model for the defined object.

According to a further embodiment of the apparatus, the mapping unit may use a transformation matrix comprising rules for the transformation of structure, behavior and the physics of the elements of the simulation object into the target simulation model. According to a further embodiment of the apparatus, the data base can be provided by a product data management system or an engineering data management system. According to a further embodiment of the apparatus, the generated target simulation model may be directly used in a simulation system for the simulation and/or validation of technical systems such as machine tools, production machines, vehicles or medical equipment. According to a further embodiment of the apparatus, the artefacts can be generated by an engineering system, such as a CAD system. According to a further embodiment of the apparatus, the mechatronics simulation tags are generated and assigned to the respective artefacts by the engineering system.

BRIEF DESCRIPTION OF THE DRAWINGS

The above-mentioned and other concepts of the present invention will now be addressed with reference to the drawings of various embodiments. The shown embodiments are intended to illustrate, but not to limit the invention. The drawings contain the following figures, in which like numbers refer to like parts throughout the description and drawings and wherein.

DETAILED DESCRIPTION

Figure 1:
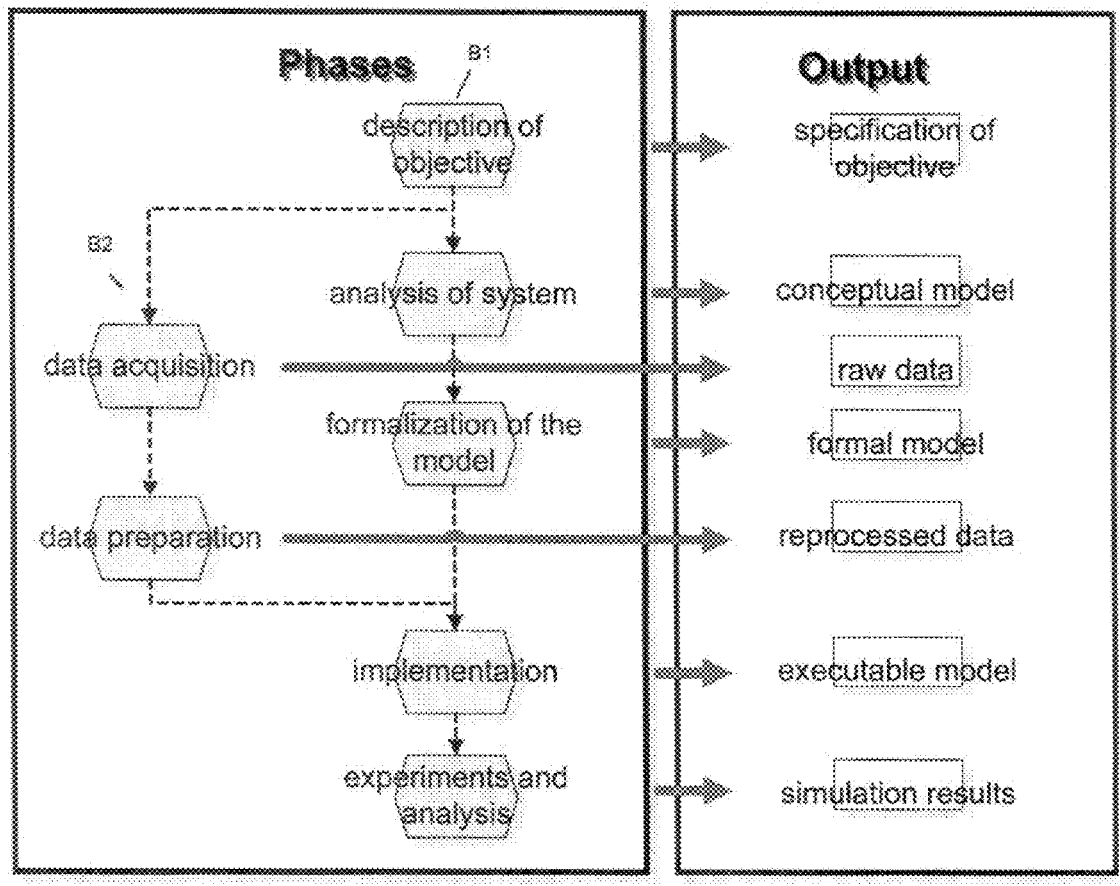
FIG. 1 shows an exemplary workflow for performing a simulation job.

The various embodiments may be implemented using hardware or software.

According to various embodiments, a method for automatically generating a target simulation model for a defined object, may comprise the following steps:

providing artefacts of the object originated during an engineering process, wherein the artefacts describing the structure, the behavior and the physics of elements of the simulation object, and wherein the artefacts comprise mechatronics simulation tags (MST) representing implicit indirect available engineering information regarding the simulation object;

storing the artefacts in a data base;

extracting out of the artefacts the information needed for generating the target simulation model based on a defined objective;

mapping the elements of the simulation object needed for generating the target simulation model based on the defined objective into the elements of the target simulation model; and assembling the extracted information and the mapped elements to generate the target simulation model for the defined object. The method allows to automatically set up simulation models. This reduces the modeling time and saves manpower and efforts. Furthermore based on a created master model target models can be derived automatically based on said master model. The artefacts of the engineering process can be for example CAD models, circuit diagrams or excel documents. Examples of defined objects in an industrial environment can be conveyor belts, robotics, machines, manufacturing cells or whole plants. The method is applicable in manufacturing industries, process industries or other industries.

According to one embodiment, the step "mapping the elements of the simulation object needed for generating the target simulation model based on the defined objective into the elements of the target simulation model" is performed by using a transformation matrix comprising rules for the transformation of structure, behavior and the physics of the elements of the simulation object into the target simulation model. The transformation matrix comprises technical, engineering and domain Know How (like a decision table) and enables the automatic generation of the target simulation model by using a computer.

According to an embodiment, the artefacts comprise a CAD model and the mechatronics simulation tags (MST) comprising lines and/or points and/or coordinate systems and/or planes and/or surfaces and/or geometric objects. In the case the artefact is a CAD model or comprises a CAD model, the CAD model can easily be enriched with mechatronics simulation tags (MST) representing lines and/or points and/or coordinate systems and/or planes and/or surfaces and/or geometric objects since these objects intrinsic elements of CAD models. Furthermore there is no break in the methodology using CAD models by creating simulation models.

According to a further embodiment, the data base is provided by a product data management system (PDM) or an engineering data management system (EDM). The artefacts including the MSTs created by using the engineering system and stored in the data base can be directly used for the generation of the target simulation model. Engineering system and simulation system are integrated by accessing the same data base. This supports the method and tool integration by creating target simulation models. The proposed method can be used in a product lifecycle management (PLM) system. A PLM System supports the process of managing the entire lifecycle of a product starting from its conception, through design and manufacture, to service and disposal.

According to yet a further embodiment, the generated target simulation model is directly used in a simulation system for simulation and/or validation of technical systems. This supports also the method and tool integration by creating target simulation models.

According to yet a further embodiment, a computer readable medium, has a program recorded thereon, wherein the program when executed is to make a computer execute the method steps of described above. The computer readable medium or storage medium may be a built-in medium installed inside a computer device main body or a removable medium arranged so that it can be separated from the computer device main body. Examples of the built-in medium include, but are not limited to, rewriteable non-volatile memories and flash memories, and hard disks. Examples of the removable medium include, but are not limited to, optical storage media such as CR-ROMs and DVDs; magneto-optical storage media, such as MOs; magnetism storage media, including but not limited to floppy disks, cassette tapes, and removable hard disks; media with a built-in rewriteable non-volatile memory, including but not limited to memory cards; and media with a built-in ROM, including but not limited to ROM cassettes; etc. Furthermore, various information regarding application data, application services, or common information models may be stored in any other form, or it may be provided in other ways.

According to yet a further embodiment, a computer program product is directly loadable into the internal memory of a digital computer, comprising software code portions for performing the method steps as described above when said product runs on the computer. Commercially available computers (e.g. Personal Computer, Laptop or Workstations) can be used for running and implementing the method steps as described above.

According to yet another further embodiment, an apparatus for automatically generating a target simulation model for a defined object, may comprise:

a creating unit for providing artefacts of the object in a data base, wherein the artefacts are designed during an engineering process, and wherein the artefacts describing the structure, the behavior and the physics of elements of the simulation object, and wherein the artefacts comprise mechatronics simulation tags (MST) representing implicit indirect available engineering information regarding the target simulation model;

an extracting unit for extracting out of the artefacts the information needed for generating the target simulation model based on a defined objective;

a mapping unit for mapping the elements of the simulation object needed for generating the target simulation model based on the defined objective of the target simulation model into the elements of the target simulation model; and an assembling unit for assembling the extracted information and the mapped elements to generate the target simulation model for the defined object. The apparatus enables to automatically set up simulation models. The apparatus comprises one or more processing units. There can be different creating units for providing respective artefacts (e.g. CAD models, spread sheets). The proposed apparatus can be integrated in a product lifecycle management (PLM) system.

A further embodiment is that the mapping unit is using a transformation matrix comprising rules for the transformation of structure, behavior and the physics of the elements of the simulation object into the target simulation model. The transformation matrix comprises technical, engineering and domain Know How and expertise (like a decision table) and enables the automatic generation of the target simulation model by using a computer. The transformation matrix can be realized as one lookup table, wherein the mapping for each element of the original artefacts to the target simulation model is stored. In case the artefacts of the engineering process are stored in an object oriented PDM system, the transformation information can be attached to each base element directly.

A further embodiment is that the data base is provided by a product data management system (PDM) or an engineering data management system. The artefacts created by using the engineering system and stored in the data base can be directly used for the generation of the target simulation model. Engineering system and simulation system are integrated by accessing the same data base.

A further embodiment is that the generated target simulation model is directly used in a simulation system for the simulation and/or validation of technical systems such as machine tools, production machines, vehicles or medical equipment. This supports also the method and tool integration by creating target simulation models.

A further embodiment is that the artefacts are generated by an engineering system, such as a CAD system. The artefacts can be generated by using hardware or software commodities for example by a commercially available CAD system.

A further embodiment is that the mechatronics simulation tags (MST) are generated and assigned to the respective artefacts by the engineering system. A conventional engineering system used for engineering and designing an industrial plant or machine can be used for generating the mechatronics simulation tags (MST) and enriching the engineering model with these tags.

It will be readily understood that the components of the present invention, as generally described and illustrated in the Figures herein, may be arranged and designed in a wide variety of different configurations. Thus, the following more detailed description of embodiments, as represented in FIGS. 1 through 4, is not intended to limit the scope of the invention, as claimed, but is merely representative of selected embodiments of the invention.

FIG. 1 shows an exemplary workflow for a simulation job. The procedure for the model set up consists of the phases "description of the objective", "system analysis", "formalization of the model", "implementation" and "analysis of the results". Each of these phases has an output. The output can be a model, data or both. The phases "data acquisition" and "data preparation" are extracted out of the main procedure branch B1, because they can be performed independently from the model set up with regard to contents, time and person. That means that the acquisition of the raw data can be started before the completion of the conceptual model and that it is also no precondition for the start of the formal model, that the acquisition of the raw data is completed. The only causation is that the "specification (description) of the objective" is used for data acquisition. The "data acquisition" has to be finalized before the start of the "data preparation" phase. And the reprocessed data is used for the implementation.

In the following the main branch B1 of the simulation procedure is discussed in more detail. The first phase is the "description of the objective". This is very important because based on the specification of the objective in the system analysis phase the questions have to be answered which components of the design or the real system are modelled, which physical effects have to be considered and especially which level of detail has to be achieved. The "conceptual model" as the result of the system analysis phase is a non-software-specific description of the simulation model that is to be developed, describing the objectives, inputs, outputs, content, assumptions and simplifications of the model. During the "formalization of the model" phase the "conceptual model" is transformed into a formal model. The formal model is a description that can be implemented without further technical clarification. The "formalization" phase is still tool independent. In real life the differentiation between "conceptual model" and "formal model" is floating. That means the "conceptual model" often already contains content of the "formal model". The complete formal model is not realised normally. The implementation is the translation of the formal model into the language of the simulation tool. Most simulation tools come with large libraries of predefined components. In this context translation means to allocate the right library object to the function. In the "experiments and analysis" phase the executable model and the prepared data are integrated.

The second branch B2 of the simulation procedure describes the processing of the data. It comprises the phases "data acquisition" and "data preparation". In the "data acquisition" phase all data is collocated that is used for the simulation experiment. The output usually is data that can not directly be reused for the simulation model. The transformation of the output of the "data acquisition" phase into the correct format for the executable model is done during the "data preparation" phase. The described workflow of a simulation job is to a large extent still a manual process today.

Figure 2:
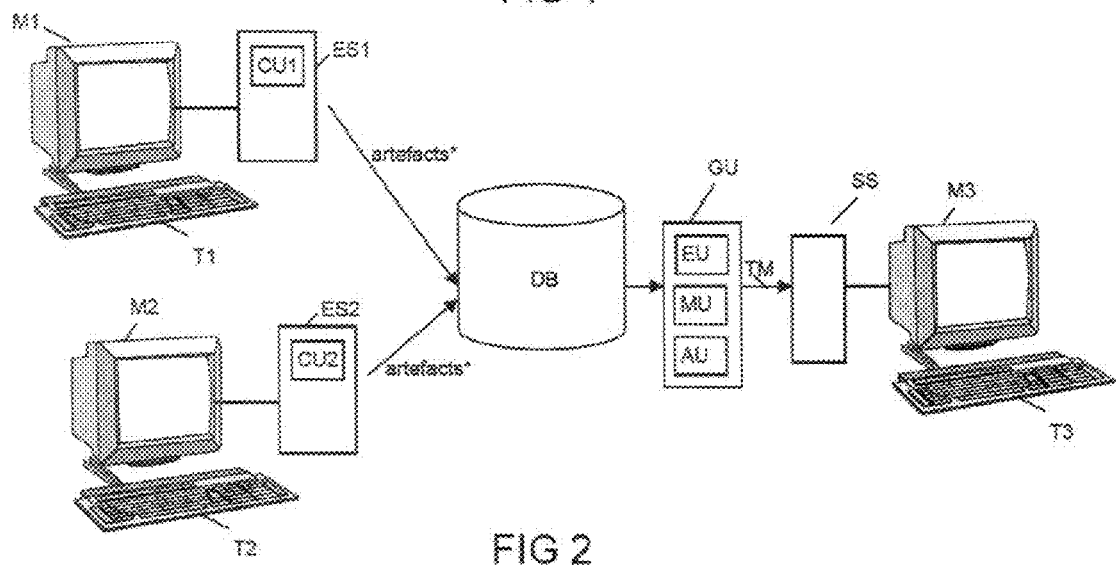
FIG. 2 shows an exemplary schematic overview diagram illustrating the implementation in a coarse grain model.

FIG. 2 shows an exemplary schematic overview diagram illustrating an implementation in a coarse grain model. Using the engineering systems ES1, ES2 (e.g. a CAD, an Elektro-CAD System) the Engineers create the artefacts and enriche the artefacts with mechatronic information by annotating the artefacts with so called mechatronic simulation tags (MST). All enriched artefacts together are building the formal model. Each engineering system ES1, ES2 comprises a processor unit and provides input means (e.g. keyboard, mouse) and output means (e.g. monitor, printer) for the engineer to build the formal model (e.g. for an industrial plant, machine or vehicle). Each engineering system ES1, ES2 (e.g. a CAD System) comprises a creating unit CU1, CU2 for providing artefacts of the simulation object in a data base DB, wherein the artefacts describing the structure, the behavior and the physics of elements of the simulation object, and wherein the artefacts comprise mechatronics simulation tags (MST) representing implicit indirect available engineering information regarding the simulation object.

The enriched artefacts (artefacts+) resp. the formal model can be stored by the engineering systems ES1, ES2 in a data base DB where a generation unit GU has access to the formal model. The generation unit GU comprises an extracting unit EU for extracting out of the artefacts the information needed for generating the target simulation model based on a defined objective of the target simulation model TM, a mapping unit MU for mapping the elements of the simulation object needed for generating the target simulation model TM based on the defined objective of the target simulation model TM into the elements of the target simulation model TM, and an assembling unit AU for assembling the extracted information and the mapped elements to generate the target simulation model TM for the defined simulation object. Advantageously the mapping unit is using a transformation matrix comprising rules for the transformation of structure, behavior and the physics of the elements of the simulation object into the target simulation model TM.

It is also possible that the engineering systems ES1, ES2 transfer the formal model directly (e.g. wired) or via an Internet connection to the generation unit GU. The generation unit GU provides the target simulation model TM for the simulation system SS. With the information of the mechatronic simulation tags (MST) the formal model is machine readable. A software application generates from the formal model the executable model of the simulation system SS. Therefore the model set up for the simulation model can be performed automatically. This quickens for example the engineering of industrial plants and increases the quality of the engineering since less manual errors can occur.

In a further embodiment the generation unit GU can be integrated in the simulation system SS. The simulation system SS can be represented by commercial off the shelf software (e.g. simulation software for virtual commissioning or finite element analysis model (FEA model)).

The creating units CU1, CU2, the extracting unit EU, the mapping unit MU, and the assembling unit AU can be realized by software programs or spread sheet applications having suitable macros.

The engineering systems ES1, ES2 and the simulation system SS having input means T1, T2, T3 (e.g. keyboard, mouse), output means M1, M2, M3 (e.g. monitor, printer), storage means, processing means (CPU) and communication means for transferring data (e.g. connection to the internet).

According to various embodiments, the simulation process shown in FIG. 1 can be automated, starting from the existing "specification of objective" and ending with the "executable model" and enable to automatically generate a simulation model. In principle the presented approach can be used for all kind of models and all domains. For manageability and performance reasons advantageously the following assumptions are made:
1) The method supports the set up of a specific model, e.g. virtual commissioning, Finite-Element-Analysis.
2) The simulation object is always of the same type, e.g. machine tool, production machine, medical equipment.
3) The objective of the simulation is always the same, e.g. calculation of Eigenfrequencies, commissioning of a mechatronic system.

In other words, the objective of the method is to automate an established simulation job. An example out of the machine tool industry: if a new machine tool is developed, then if the new design exists, i.e. the CAD model exists, a mechatronic simulation is performed to evaluate the dynamic behaviour of the new design. For that from the CAD model a FEA model is derived and coupled with the predefined model of the closed loop control system. This is a recurring, well known simulation job. The set up of the model is more or less always the same.

Figure 3:
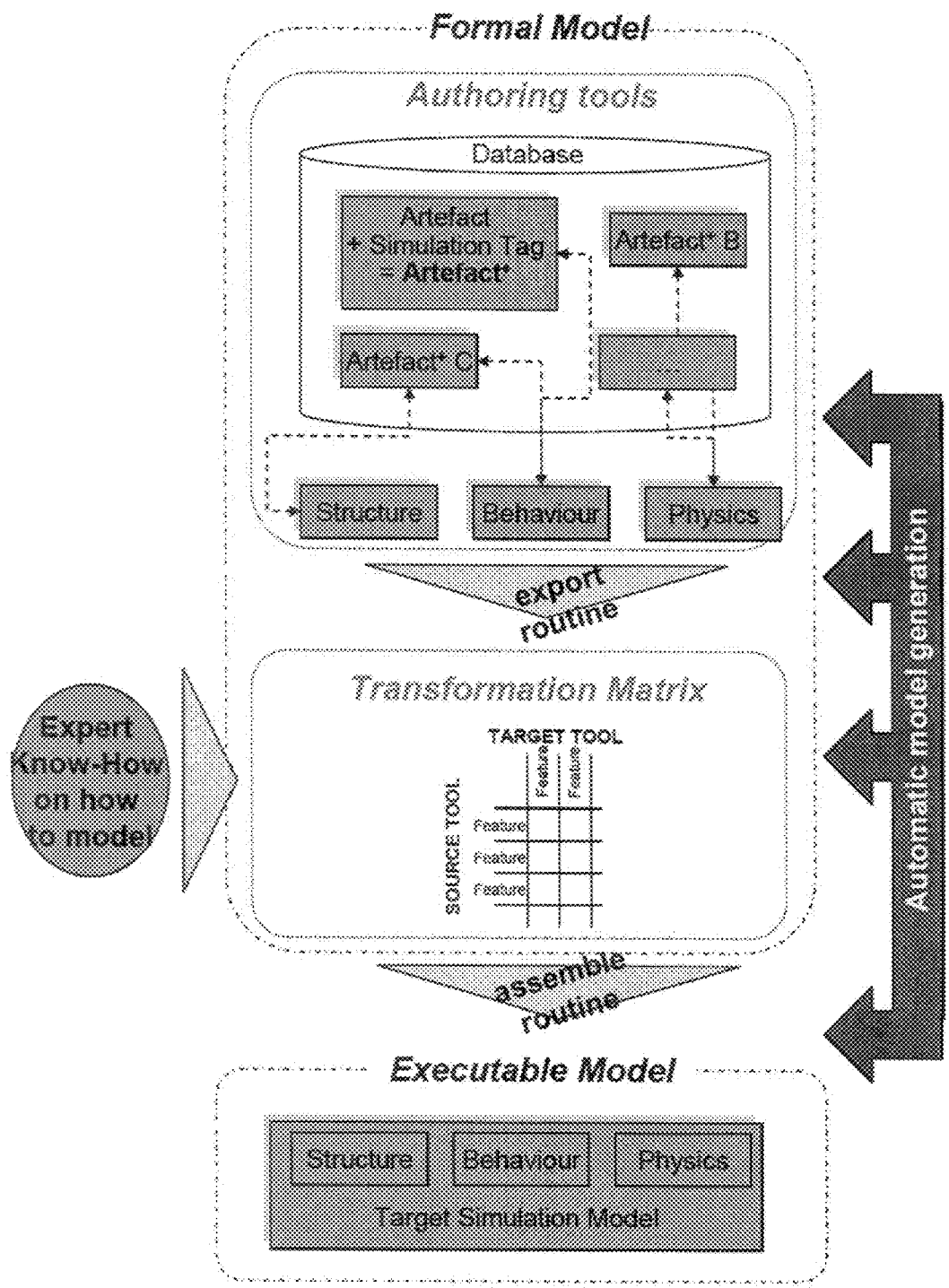
FIG. 3 shows an exemplary schematic overview diagram illustrating the concept for automatic model generation.

FIG. 3 shows an exemplary schematic overview diagram illustrating the concept for automatic model generation. Considering the assumptions 1 to 3 the output of step 1 "description of objective" and step 2 "analysis of system" of the simulation process described above is clear. That means for the specific executable simulation model that should be generated it is clear, which components have to be modelled and how they are linked with each other—the structure, which effects have to be modelled and in which detail they have to be modelled—physics and which causal connections, e.g. sensor, actor connection, or behaviour over time—the behaviour—have to be modelled. Furthermore it is well known, which information comes from which artefact. So all information that is needed to set up the executable simulation model is available in the existing artefacts of the preceded design steps. Also the information are available three kinds of availability have to be distinguished. With availability the possibility is meant to get the information out of the system in a formal way:
1. Explicit availability: Explicit means that an export interface exists. Typical data that is explicit available are geometry, IO tables and kinematics.
2. Implicit direct availability: Implicit direct means that an intermediate step has to be performed to get the information out of the system. Examples therefore are to get the inertia of a component out of a CAD model or to get a parameter out of a component. In the first example first the inertia has to be calculated by an integrated functionality. Then the inertia can be exported. In the second example the value of the parameter can be exported by "copy & past" or with respect to automatic model generation the API (Application Programming Interface) of the tool has to be use to program an algorithm that extracts the parameter automatically.
3. Implicit indirect availability: These information are available but can not be extracted by a tool automatically. Today this information can only be lifted by the know-how of an engineer. For example, a FEA model of a machine tool should be set up based on a 3D CAD model. Out of the 3D geometry for the engineer it is obvious where the carriages of the linear guideways are. Based on the visual inspection the simulation engineer models a spring in the appropriate position in the FEA model. Or another example, a virtual commissioning model should be set up also based on a 3D CAD model. Here the CAD model is a conveyor. And the CAD model also shows a sensor, either as 3D geometry or as marker. The sensor has to be modelled in the virtual commissioning model too. But as in the previous example the translation of the 3D geometry into the sensor in the virtual commissioning model today can only be done by an engineer.

With respect to the automatic model generation for case one nothing has to be done. The information of type two, implicit direct, cause no problems either, if the authoring tool of the artefact has an open and appropriate API (Application Programming Interface). In this case an algorithm has to be developed that extracts the needed information. The information of the third case is the challenge for the to the automatic model generation. Here model information has to be made machine readable. Since the artefacts and the related tools are quite different from today's view a general approach does not exist. For each implicit indirect information an individual solution has to be developed.

Figure 4:
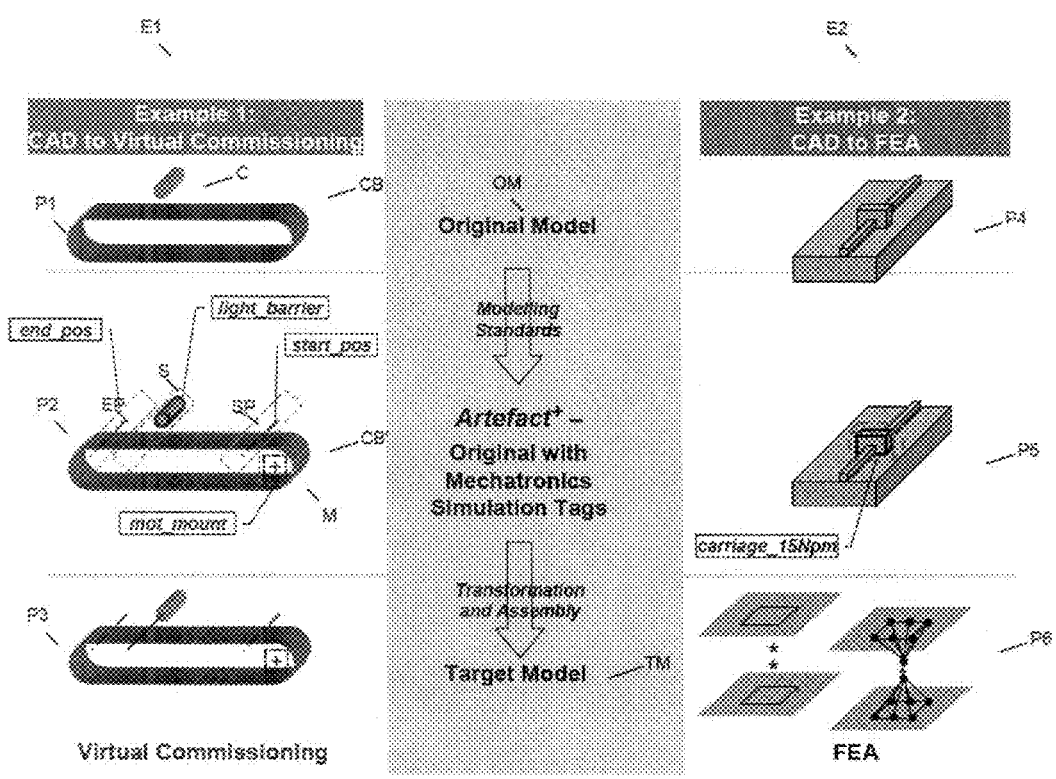
FIG. 4 shows two examples to make information machine readable by using mechatronic simulation tags.

FIG. 4 shows two examples E1, E2 to make information machine readable for models that are based on geometric information by using mechatronic simulation tags. The example E1 in the left column shows the transition from a CAD model to a virtual commissioning model. The example E2 in the right column shows the transition from a CAD model to a FEA model. In the rows the migration from implicit indirect information to machine readable information to the implementation in the target system is shown.

Example E1

First the transition from CAD to virtual commissioning (example E1) is explained. The first picture P1 shows the CAD model before automatic model generation. You can see a conveyor belt CB. A cylinder C represents a sensor. Besides the 3D geometry the conveyor in the virtual commissioning model is defined through a material entry position SP, a material exit position EP, a sensor S and the information whether he is powered or not. To get this information out of the CAD model the CAD model is enriched with so called Mechatronics Simulation Tags (MST). Mechatronics Simulation Tags in a CAD model can be lines, points, coordinate systems, planes, surfaces or whole geometric objects. In FIG. 4 (picture P2) at the material entry position SP and at the material exit position EP of the conveyor CB' the CAD feature "line" was added. Further on a "point" was positioned to mark a motor M. The motor marker makes clear that this conveyor CB' is powered. And to make the geometric object "cylinder" C recognisable as sensor S a tag is added.

Example E2

The same mechanism was used in the CAD-FEA example E2 to make a cuboid (picture 4) recognizable as carriage of a guideway for the later FEA model (picture 6), the tag "carriage_15Npm" (picture 5) was added. The tags make the markers identifiable. In our example the tags are "end_pos", "light_barrier", "mot_mount" and so on. For the simulation expert it is clear (assumptions 1 and 2) that in the FEA model (picture P6) the cuboid "carriage_15Npm" is replaced through a force element.

As described before the markers that make the information machine readable have to be defined for each automatic model generation task individually. Here the combination of the tag with the CAD feature is the "Mechatronics Simulation Tag" (MST). For the automatic model generation the artefacts have to be made intelligent through Mechatronic Simulation Tags (MST). These advanced artefacts are called "artefact$^+$".

The column in the middle of FIG. 4 shows the principle approach according to various embodiments: Creating an original model OM comprising artefacts, enriching the original model with mechatronic simulation tags (MST) to build advanced artefacts, so called artefact$^+$, transformation to the target model TM.

To come back to the main concept shown in FIG. 3 the artefacts$^+$ are the source for the structure, behaviour and physics that is needed to set up the simulation model. As explained this information exists in the artefacts but in most cases it is not explicit available and therefore it has to be made machine readable by Mechatronics Simulation Tags (MST) first. The information that is needed to set up the target model can be extracted by an algorithm implemented in software. Which information has to be extracted is known from the daily modelling work.

The next step in the concept is the mapping of the original elements into the elements of the target model. For this the so called "Transformation Matrix" is used (see FIG. 3). This can be explained in more detail by referring to the CAD-FEA example of FIG. 4 (example E2). For the simulation expert it is clear (assumptions 1 and 2) that in the FEA model the cuboid "carriage_15Npm" is replaced through a force element. For the automatic model generation the Transformation Matrix does this job. Out of the Transformation Matrix the algorithm gets the association of the cuboid to a definite force element. Another transformation would be the mapping of the boundary of the upper and lower surfaces of the cuboid into meshing areas. The parameterization can be derived from the tag. The parameterization is normally not part of the CAD model. But based on the tag the parameterization can be extracted out of another database. The Transformation Matrix for the automatic model generation consists of rules for the transformation of structure, behaviour and physics. The example makes clear that the set up of the Transformation Matrix can only be done by the know-how of the simulation engineers. Further on the Transformation Matrix can have intelligence. For example during the transition from the formal model to the executable model the granularity of the model can be changed. An example out of the hydraulics would be that in a process and instrumentation diagram drains for service are drawn. For the simulation model they do not have any relevance, in contrast they can raise the calculation time significantly. So the transformation matrix could recognize drains and replace them through a pipe without drain. In this case a model reduction was performed.

The last step of the concept is the assembly of the target model TM from the extracted and transformed information of the previous steps. The format is given through the target system. For the example regarding the carriage from FIG. 4 (example 2) the assembly step consists of the following actions: first the mesh generator is activated. The mesh areas out of the transformation step force the mesh generator to place nodes on the lines. Based on the nodes the force element is generated and parameterized.

During the set up of simulation models the simulation engineer has to decide which effects have to be considered in the simulation model. Then he has to define how they are modeled. And last but not least he has to set up the model. For this the know-how of an engineer is needed. And that is the reason why the model set up is performed manually today.

In principle of various embodiments can be applied for all kinds of models and domains. For performance reasons advantageously various embodiments are focused for the model set up on a very specific model (see assumptions in point 3). Then the engineer defines based on his know-how a master model only once. Based on the master model further simulation models can be generated automatically. Another aspect of various embodiments is to define the elements of the master model and how to transform them into the target model TM.

As described before today a lot of time is spend for setting up simulation models. According to various embodiments, the modelling effort can be reduced drastically. The reduction of modelling time is direct saving of real manpower, time and with this saving money.

Figure 5:
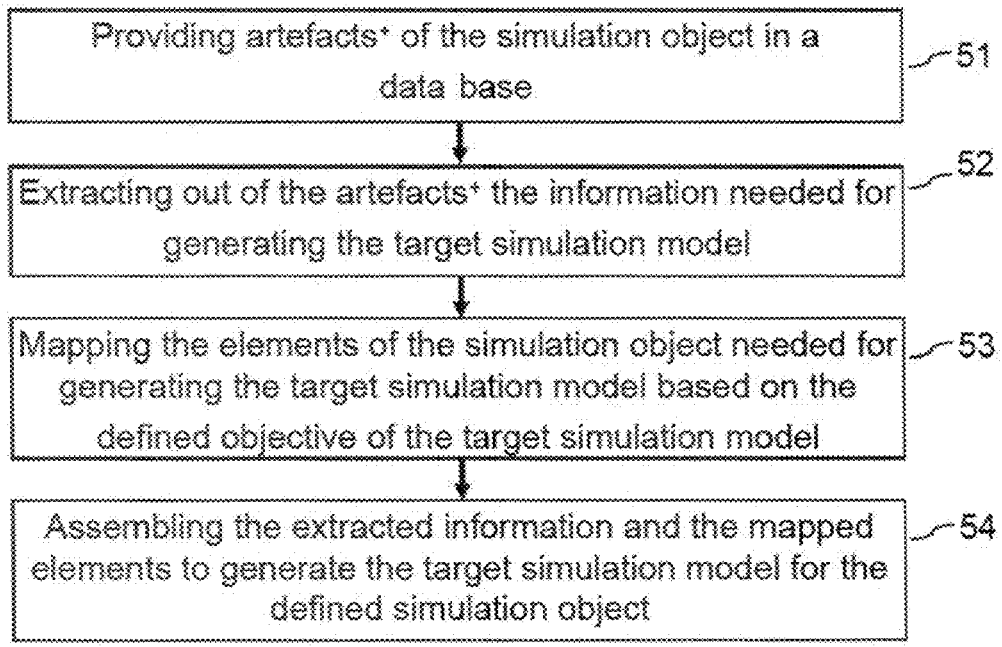
FIG. 5 shows an exemplary flowchart describing the steps for performing various embodiments.

FIG. 5 shows an exemplary flowchart describing the steps 51 to 54 for performing various embodiments. In step 51 "providing artefacts of the simulation object in a data base" the artefacts for a model will be provided (e.g. by a CAD System). The artefacts will be enriched by mechatronic simulation tags (MST) to make the artefacts machine readable and to make them automatically further processable. The artefacts enriched by MSTs are called artefacts$^+$. Advantageously the artefacts$^+$ will be stored in a data base for documentation and for reusability in further projects or solutions. The artefacts describing the structure, the behavior and the physics of elements of the simulation object, and wherein the artefacts comprise mechatronics simulation tags (MST) representing implicit indirect available engineering information regarding the simulation object. In the step 52 "extracting out of the artefacts the information needed for generating the target simulation model" the information which is needed for automatically generating the target model is derived from the enriched model based on a defined objective of the target simulation model. In the next step 53 the elements of the simulation object needed for generating the target simulation model are mapped from the enriched original model (comprising artefacts+) to the target simulation model based on the defined objective of the target simulation model. Advantageously the mapping is performed by using a transformation matrix comprising rules for the transformation of structure, behavior and the physics of the elements of the simulation object into the target simulation model. For example the transformation matrix can be implemented by a spread sheet. The output of step 54 "assembling the extracted information and the mapped elements to generate the target simulation model for the defined simulation object" is a executable target simulation model. The format is given through the target system.

Figure 6:
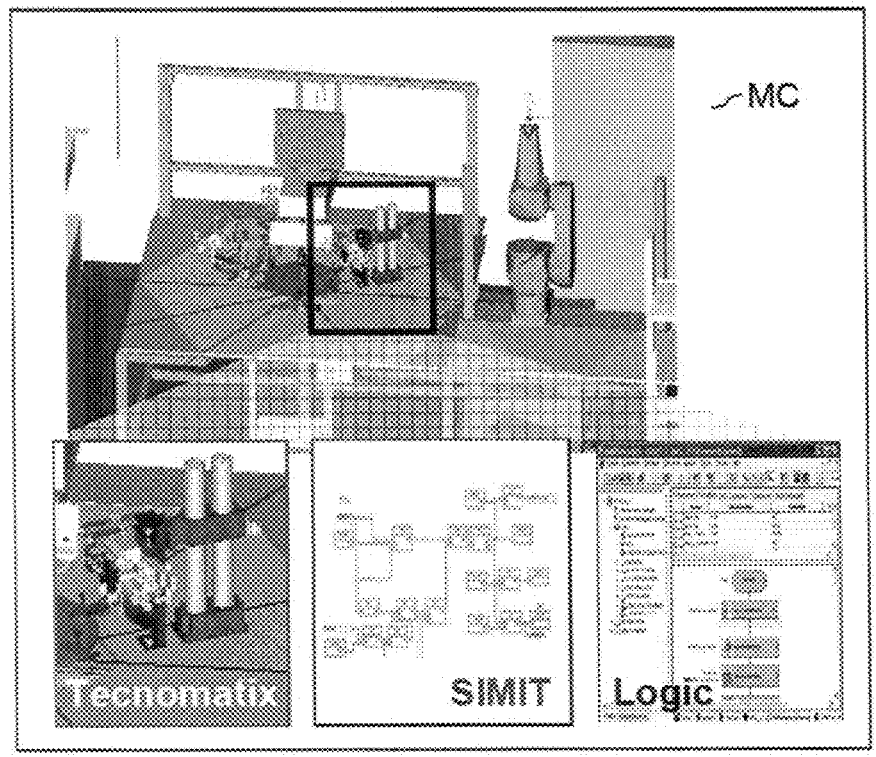
FIG. 6 shows an exemplary use case applying various embodiments for virtual commissioning of a modular manufacturing cell.

FIG. 6 shows an exemplary use case applying various embodiments for virtual commissioning of a modular manufacturing cell. The specialty of the manufacturing cell is its modular set up, that means besides the mechanical, electrical and pneumatic set up each module comes with its own controller including control logic. The modules can be flexible combined or replaced through other modules to a large variety of different cells depending on the job. If the modules are combined to a new cell for a new job the set up has to be validated. This is done with virtual commissioning. Each new set up needs a new virtual commissioning model. That was the reason to apply the new method to this project. FIG. 6 shows the virtual commissioning model of the modular manufacturing cell MC as hardware-in-the-loop simulation. The virtual commissioning model of the manufacturing cell consists of a model of the mechanics and electrics that is coupled to the real controller with the original PLC program (logic) running on it. The model of the mechanics includes the geometry, the kinematics, actuators and sensors and is implemented in Tecnomatix™. The model of the electrics describes e.g. the activation of the motors via contactors and the dynamic behavior of the motors. For the electrical model SIMIT™ is used. Most of the information of the mechanical model are derived from the CAD model while the data for the model of the electrics is derived from the circuit diagrams.

A method and an apparatus for automatically generating a target simulation model for a defined simulation object, the method comprising the following steps: providing artefacts+ of the simulation object in a data base, wherein the artefacts+ describing the structure, the behavior and the physics of elements of the simulation object, and wherein the artefacts+ comprise mechatronics simulation tags (MST) representing implicit indirect available engineering information regarding the simulation object; extracting out of the artefacts+ the information needed for generating the target simulation model based on a defined objective of the target simulation model; mapping the elements of the simulation object needed for generating the target simulation model based on the defined objective of the target simulation model into the elements of the target simulation model; and assembling the extracted information and the mapped elements to generate the target simulation model for the defined simulation object. An aspect of various embodiments is to define the elements of the master model and how to transform them into the target model. Today a lot of time is spent for setting up simulation models. With various embodiments the modelling effort can be reduced drastically. The reduction of modelling time is direct saving of real manpower, time and with this saving money.

REFERENCES

B1, B2 Branch
ES Engineering System
SS Simulation System
GU Generating Unit
CU1, CU2 Creating Unit
MU Mapping Unit
EU Extracting Unit
AU Assembling Unit
M1, M2, M3 Output Means
T1, T2, T3 Input Means
DB Data Base
E1, E2 Example
P1-P6 Picture
C Cylinder
CB, CB' Conveyor Belt
SP Entry Position
EP Exit Position
M Motor
OM Original Model
TM Target Model
S51-S54 Method Steps
MC Manufacturing Cell

What is claimed is:
1. A method for generating a target simulation model for a defined physical object, the method comprising:
providing artefacts of the defined physical object originated during a non-automated engineering process, wherein the artefacts describe the structure, the behavior, and the physics of elements of the defined physical object, and wherein the artefacts comprise mechatronics simulation tags representing available engineering information not extracted automatically by a tool, regarding the defined physical object;
wherein the artefacts comprise a CAD model of the defined physical object and the mechatronics simulation tags comprise at least one of lines, points, coordinate systems, planes, surfaces, and geometric objects;
storing the artefacts in a data base;
automatically extracting out of the artefacts the information needed for generating the target simulation model based on a defined objective;
automatically mapping the elements of the defined physical object needed for generating the target simulation model based on the defined objective into elements of the target simulation model using a transformation matrix comprising rules for the transformation of structure, behavior and the physics of the elements of the defined physical object into model elements in the language of a simulation tool; and
automatically assembling the extracted information and the mapped elements to generate the target simulation model for the defined physical object, the target simulation model comprising a finite elements analysis (FEA) model usable by the simulation tool to analyze a physical behavior of the defined physical object; and performing, by the simulation tool, a simulation of the physical behavior of the defined physical object using the finite elements analysis (FEA) model.

2. The method according to claim 1, wherein the data base is provided by a product data management system or an engineering data management system.

3. A computer program product comprising a computer readable non-transitory medium comprising instructions which can be loaded into the internal memory of a digital computer and which when executed by the computer perform the steps of:

providing artefacts of a defined physical object originated during a non-automated engineering process, wherein the artefacts describe the structure, the behavior and the physics of elements of the defined physical object, and wherein the artefacts comprise mechatronics simulation tags representing available engineering information not extracted automatically by a tool, regarding the defined physical object;

wherein the artefacts comprise a CAD model of the defined physical object and the mechatronics simulation tags comprise at least one of lines, points, coordinate systems, planes, surfaces, and geometric objects;

storing the artefacts in a data base;

extracting out of the artefacts the information needed for generating a target simulation model based on a defined objective;

mapping the elements of the defined physical object needed for generating the target simulation model based on the defined objective into elements of the target simulation model using a transformation matrix comprising rules for the transformation of structure, behavior and the physics of the elements of the defined physical object into model elements in the language of a simulation tool; and assembling the extracted information and the mapped elements to generate the target simulation model for the defined physical object, the target simulation model comprising a finite elements analysis (FEA) model usable by the simulation tool to analyze a physical behavior of the defined physical object; and performing, by the simulation tool, a simulation of the physical behavior of the defined physical object using the finite elements analysis (FEA) model.

4. The computer program product according to claim 3, wherein the data base is provided by a product data management system or an engineering data management system.

5. An apparatus for automatically generating a target simulation model for a defined physical object, the apparatus comprising:

a creating processor unit for providing artefacts of the defined physical object in a data base, wherein the artefacts are generated during a non-automated engineering process, and wherein the artefacts describe the structure, the behavior, and the physics of elements of the defined physical object, and wherein the artefacts comprise mechatronics simulation tags representing available engineering information not automatically extracted by a tool, regarding the target simulation model, the artefacts comprising a CAD model of the defined physical object and the mechatronics simulation tags comprise at least one of lines, points, coordinate systems, planes, surfaces, and geometric objects;

an extracting processor unit for extracting out of the artefacts the information needed for generating the target simulation model based on a defined objective;

a mapping processor unit for mapping the elements of the defined physical object needed for generating the target simulation model based on the defined objective of the target simulation model into elements of the target simulation model using a transformation matrix comprising rules for the transformation of structure, behavior and the physics of the elements of the defined physical object into model elements in the language of a simulation tool; and an assembling processor unit for assembling the extracted information and the mapped elements to generate the target simulation model for the defined physical object, the target simulation model comprising a finite elements analysis (FEA) model usable by the simulation tool to analyze a physical behavior of the defined physical object; and a simulation tool for performing a simulation of the physical behavior of the defined physical object using the finite elements analysis (FEA) model.

6. The apparatus according to claim 5, wherein the data base is provided by a product data management system or an engineering data management system.

7. The apparatus according to claim 5, wherein the mechatronics simulation tags are generated and assigned to the respective artefacts by an engineering system.

* * * * *